United States Patent
Livingstone et al.

(10) Patent No.: US 11,460,273 B2
(45) Date of Patent: Oct. 4, 2022

(54) 1-TO-N MUNITIONS ADAPTER FOR AN AIRBORNE PLATFORM

(71) Applicant: Textron Systems Corporation, Wilmington, MA (US)

(72) Inventors: Abel Livingstone, Hampstead, NH (US); Walter Hunter Hild, Hiram, ME (US)

(73) Assignee: Textron Systems Corporation, Hunt Valley, MD (US)

( * ) Notice: Subject to any disclaimer, the term of this patent is extended or adjusted under 35 U.S.C. 154(b) by 866 days.

(21) Appl. No.: 16/298,148

(22) Filed: Mar. 11, 2019

(65) Prior Publication Data

US 2019/0277603 A1 Sep. 12, 2019

Related U.S. Application Data

(60) Provisional application No. 62/641,723, filed on Mar. 12, 2018.

(51) Int. Cl.
*F41G 9/02* (2006.01)
*B64D 1/04* (2006.01)
(Continued)

(52) U.S. Cl.
CPC .................. *F41G 9/02* (2013.01); *B64D 1/04* (2013.01); *B64D 1/06* (2013.01); *B64D 7/08* (2013.01); *F41F 3/06* (2013.01)

(58) Field of Classification Search
CPC .... B64D 1/04; B64D 1/06; B64D 7/08; F41F 3/0406; F41F 3/052; F41F 3/06
See application file for complete search history.

(56) References Cited

U.S. PATENT DOCUMENTS

| 4,441,674 A | 4/1984 | Holtrop |
| 4,589,615 A | 5/1986 | Walker, Jr. |

(Continued)

FOREIGN PATENT DOCUMENTS

| EP | 2053480 A2 | 4/2009 |
| GB | 2403789 A | 1/2005 |
| WO | WO2008121431 A2 | 10/2008 |

OTHER PUBLICATIONS

European Search Report issued by European Patent Office dated Jul. 18, 2019 for European Application No. EP19161694.5, filed Mar. 8, 2019, 10 pages.
(Continued)

*Primary Examiner* — Joshua E Freeman
(74) *Attorney, Agent, or Firm* — BainwoodHuang

(57) ABSTRACT

A 1-to-N munitions adapter that includes a physical launcher interface, a physical munitions interface, and electronic control circuitry. The physical launcher interface is operable to connect the 1-to-N munitions adapter to a single munition launcher that is i) configured and arranged to carry and launch a single munition of a first type, and ii) integrated to an airborne platform. The physical munitions interface is operable to connect the 1-to-N munitions adapter to multiple munitions of a second type. The 1-N munitions adapter i) emulates a control interface of a single munition of the first type to the single munition launcher, in part by identifying the 1-to-N munitions adapter to the single munition launcher as a single munition of the first type, and ii) selectively controls the release of munitions of the second type while the airborne platform is in flight in response to signals received from the single munition launcher.

18 Claims, 6 Drawing Sheets

(51) Int. Cl.
  *B64D 1/06* (2006.01)
  *F41F 3/06* (2006.01)
  *B64D 7/08* (2006.01)

(56) References Cited

U.S. PATENT DOCUMENTS

| | | | | |
|---|---|---|---|---|
| 5,148,734 | A | * | 9/1992 | Lilly ............... F41F 3/06 |
| | | | | 89/1.819 |
| 5,229,538 | A | * | 7/1993 | McGlynn ............. B64D 7/00 |
| | | | | 89/1.56 |
| 5,742,609 | A | * | 4/1998 | Kondrak ............... F41F 3/04 |
| | | | | 370/465 |
| 5,907,118 | A | | 5/1999 | Jakubowski, Jr. et al. |
| 6,615,116 | B2 | | 9/2003 | Ebert et al. |
| 6,761,333 | B2 | | 7/2004 | Foster et al. |
| 7,610,841 | B2 | | 11/2009 | Padan |
| 7,868,276 | B2 | * | 1/2011 | Grimshaw ............. H04L 67/12 |
| | | | | 703/23 |
| 8,881,094 | B2 | | 11/2014 | Hatcherson et al. |
| 10,029,791 | B2 | * | 7/2018 | Roemerman ............ F41F 3/065 |
| 2010/0326264 | A1 | * | 12/2010 | Roemerman ............ B64D 1/06 |
| | | | | 89/1.56 |
| 2016/0288906 | A1 | * | 10/2016 | Christof ................ B64D 37/12 |

OTHER PUBLICATIONS

"AGM-114R Multi-Purpose Hellfire II", Lockheed Martin Corporation, Missiles and Fire Control, 2011, 2 pages.
"DAGR—Precision-Strike Capability in a 2.75 inch/70mm Guided Rocket", Lockheed Martin Corporation, Missiles and Fire Control, 2010, 2 pages.
"SSW—Small Smart Weapon", Lockheed Martin Corporation, Missiles and Fire Control, 2008, 2 pages.

* cited by examiner

1-TO-N MUNITIONS ADAPTER FOR AN AIRBORNE PLATFORM

CROSS REFERENCE TO RELATED APPLICATIONS

The present application claims priority to U.S. Provisional Patent Application No. 62/641,723 filed on Mar. 12, 2018, all disclosures of which are hereby included by reference herein.

TECHNICAL FIELD

The present disclosure relates generally to airborne munition platforms, and more specifically to a 1-N munitions adapter for an airborne platform.

BACKGROUND

Airborne platforms, including both unmanned aerial vehicles and manned aircraft, are often used to carry munitions. From time to time, new types of munitions are developed and become available for potential delivery by way of such airborne platforms.

SUMMARY

Integrating a new type of munition to an existing airborne platform ordinarily requires extensive validation and testing, and is therefore time consuming and resource intensive. It would be highly desirable to have a technical solution that effectively limits the amount of validation and testing required to integrate a new type of munition to an airborne platform.

In order to address the above described and other technical objectives, a new 1-to-N munitions adapter is described herein that includes a physical launcher interface, a physical munitions interface, and electronic control circuitry. The physical launcher interface is configured and arranged to mechanically and electrically connect the 1-to-N munitions adapter to a single munition launcher. The single munition launcher is i) configured and arranged to carry and launch a single munition of a first type, and ii) integrated to an airborne platform. The physical munitions interface is configured and arranged to mechanically and electrically connect the 1-to-N munitions adapter to multiple munitions of a second type. The 1-N munitions adapter is configured and arranged to i) emulate a control interface of a single munition of the first type to the single munition launcher, at least in part by identifying the 1-to-N munitions adapter to the single munition launcher as a single munition of the first type, and ii) selectively control the release of multiple ones the munitions of the second type that are carried by the 1-to-N munitions adapter while the airborne platform is in flight in response to signals received from the single munition launcher.

In some embodiments, the 1-to-N munitions adapter may be configured and arranged to selectively control the release of multiple ones of the munitions of the second type that are carried by the 1-to-N munitions adapter while the airborne platform is in flight at least in part by determining a specific number of munitions of the second type that are to be released by the 1-to-N munitions adapter for a specific launch (or "fire") command received from the single munition launcher. For example, the electronic control circuitry in the 1-N munitions adapter may determine the specific number of munitions of the second type that are to be released for a specific launch command in response to one or more launch control signals for the single munition of the first type that are received by the 1-to-N munitions adapter from the single munition launcher at the time the launch command is received by the 1-to-N munitions adapter from the single munition launcher.

In some embodiments, the 1-to-N munitions adapter may be configured and arranged to determine a specific number of munitions of the second type that are to be released by the 1-to-N munitions adapter that is between 1 and N, in response to determining which one of N discrete sets of single munition launch control signals is received by the 1-to-N munitions adapter from the single munition launcher. In such embodiments, each one of the N discrete sets of single munition launch control signals may uniquely correspond to a number of munitions of the second type that are to be released that is between 1 and N. In this way, embodiments of the 1-to-N munitions adapter may operate at least in part by translating (or "re-purposing") each one of the N sets of launch control signals that control the launch and mission parameters of a single munition of the first type to a unique corresponding number of munitions of the second type that are to be automatically released from the 1-to-N munitions adapter at the time a launch (or "fire") command is received by the 1-to-N munitions adapter from the single munition launcher.

In some embodiments the multiple munitions of the second type that are carried by the 1-to-N munitions adapter may consist of three munitions of the second type (i.e. N=3), and the 1-N munitions adapter may be configured and arranged to selectively control the release of multiple ones of the munitions of the second type carried by the 1-to-N munitions adapter while the airborne platform is in flight at least in part by i) releasing up to a single munition of the second type in response to detecting the receipt of a first set of single munition launch control signals from the single munition launcher at the time a launch command is received from the single munition launcher, ii) releasing up to two munitions of the second type in response to detecting the receipt of a second set of single munition launch control signals from the single munition launcher at the time the launch command is received from the single munition launcher, and ii) releasing all remaining munitions of the second type in response to detecting the receipt of a third set of launch control signals from the single munition launcher at the time the launch command is received from the single munition launcher.

In some embodiments, the 1-to-N munitions adapter may be further configured and arranged to load a single target location received from the single munition launcher into each one of the multiple munitions of the second type that are to be released in response to receipt of the launch command from the single munition launcher.

In some embodiments, the 1-to-N munitions adapter may be further configured and arranged to operate in response to detecting that the 1-to-N munitions adapter has released at least one munition of the second type on a target by determining whether there is at least one additional munition of the second type that is still present on the 1-to-N munitions adapter. For example, in such embodiments, in response to detecting that there is still at least one additional munition of the second type present on the 1-to-N munitions adapter, the electronic control circuitry in the 1-to-N munitions adapter i) resets the 1-to-N munitions adapter (e.g. transitions the 1-N munitions adapter to an unpowered mode or performs some other type of reset operation), and ii) generates a signal that is accessible to the single munition launcher (e.g. as part of a status message or the like that is conveyed by the 1-to-N munitions adapter to the single munition launcher) and that indicates to the single munition launcher that a single munition of the first type is available for launch. For example, in some embodiments, the 1-to-N munitions adapter may respond to a query received from the single munition launcher that inquires as to whether a single munition is available to be launched by indicating to the single munition launcher that a single munition of the first type is available to be launched whenever one or more munitions of the second type remain physically carried by the 1-to-N munitions adapter and are available to be released by the 1-to-N munitions adapter. Advantageously, even though the single munition launcher is designed such that it expects that following the launch of a single munition of the first type no further munitions are available, such embodiments of the 1-to-N munitions adapter may operate to inform the single munition launcher that a munition of the first type is are available to be launched even after release of one or more munitions of the second type by the 1-to-N munitions adapter.

In some embodiments, the single munition launcher may be configured and arranged to carry and launch a single munition having a first size and/or geometry and that is powered by a single solid-fuel rocket engine, and the 1-to-N munitions adapter may be configured and arranged to carry and selectively control the release of multiple munitions of the second type that each have a second size and/or geometry and that are glide weapons without rocket power (e.g. guided glide weapons or unguided munitions such as what may sometimes be referred to as "dumb bombs").

In some embodiments, the 1-to-N munitions adapter may be further configured and arranged to translate a single target location that is received from the single munition launcher from a first target location format understood by the first type of munition to a second target location format that is understood by the second type of munition. Examples of target location formats that may be translated by embodiments of the disclosed 1-N munitions adapter include formats for angular-based targeting (e.g., platform- or launcher-referenced azimuth, elevation), coordinate-based targeting (e.g., latitude/longitude/altitude, Military Grid Reference System (MGRS), etc.), geodetic coordinates, combinations thereof, and so on.

In some embodiments, the 1-to-N munitions adapter may be further operable to emulate a weapon stores management system to the multiple munitions of the second type that are carried by the 1-to-N munitions adapter.

In some embodiments, the single munition launcher may include multiple interface points, and each one of the multiple interface points may be capable of carrying and controlling the launch of a single munition of the first type. In such embodiments, a separate individual 1-to-N munitions adapter may be communicably attached to each of the individual interface points of the single munition launcher. The multiple interface points of the single munition launcher may sometimes be referred to as "rails" of the single munition launcher.

Embodiments of the 1-to-N munitions adapter described herein may provide significant advantages. For example, by emulating a control interface of a single munition to a single munition launcher that is attached to an airborne platform, embodiments of the 1-to-N munitions adapter described herein appear as a single munition to the single munition launcher, and can therefore seamlessly operate with an existing and independently developed and tested infrastructure that spans the single munition launcher, the airborne platform, and a remote command and control station. In this way, the 1-to-N munitions adapter described herein leverages testing previously performed on the existing infrastructure, and effectively limits the amount of additional validation and testing that is required to integrate a new type of munition to an existing infrastructure including an airborne platform itself. The multiple munitions of the second type that are carried by the 1-to-N munitions adapter may be from a different category of weapon than the single munition of the first type that is emulated by the 1-to-N munitions adapter to the single munition launcher, e.g. the munitions of the second type may be guided glide weapons as opposed to a munition of the first type that is a rocket powered weapon. In addition, by increasing the number of munitions carried by the airborne platform, embodiments of the 1-to-N munitions adapter may advantageously enable the airborne platform to fire more individual munitions against identified targets, and/or to fire on a larger number of targets during an individual sortie.

BRIEF DESCRIPTION OF THE DRAWINGS

The foregoing and other objects, features and advantages will be apparent from the following description of particular embodiments of the disclosed technology, as illustrated in the accompanying drawings in which like reference characters refer to the same parts throughout the different views. The drawings are not necessarily to scale, emphasis instead being placed upon illustrating the principles of various embodiments of the disclosed technology.

DETAILED DESCRIPTION

Embodiments of the invention will now be described. The embodiments described below are provided as examples in order to illustrate various features and principles of the invention. The invention is broader than the specific examples of embodiments provided herein.

The individual features of the embodiments, examples, and implementations described herein can be combined in any manner that makes technological sense. Such features described herein are hereby combined to form all possible combinations, permutations and variants except to the extent that such combinations, permutations and/or variants have been explicitly excluded or are impractical. Support for such combinations, permutations and variants is considered to exist in this document.

The embodiments described herein include a 1-to-N munitions adapter having a physical launcher interface, a physical munitions interface, and electronic control circuitry. The physical launcher interface of the 1-to-N munitions adapter described herein is configured and arranged to mechanically and electrically connect the 1-to-N munitions adapter to a single munition launcher. The single munition launcher is i) configured and arranged to carry and launch a single munition of a first type, and ii) integrated to an airborne platform. The physical munitions interface of the 1-to-N munitions adapter described herein is configured and arranged to mechanically and electrically connect the 1-to-N munitions adapter to multiple munitions (e.g. 2, 3, 4, etc.) of a second type. The 1-N munitions adapter is configured and arranged to i) emulate a control interface of a single munition of the first type to the single munition launcher, at least in part by identifying the 1-to-N munitions adapter to the single munition launcher as a single munition of the first type, and ii) selectively control the release of individual and/or multiple ones the munitions of the second type that are carried by the 1-to-N munitions adapter while the airborne platform is in flight in response to signals received by the 1-to-N munitions adapter from the single munition launcher.

Figure 1:
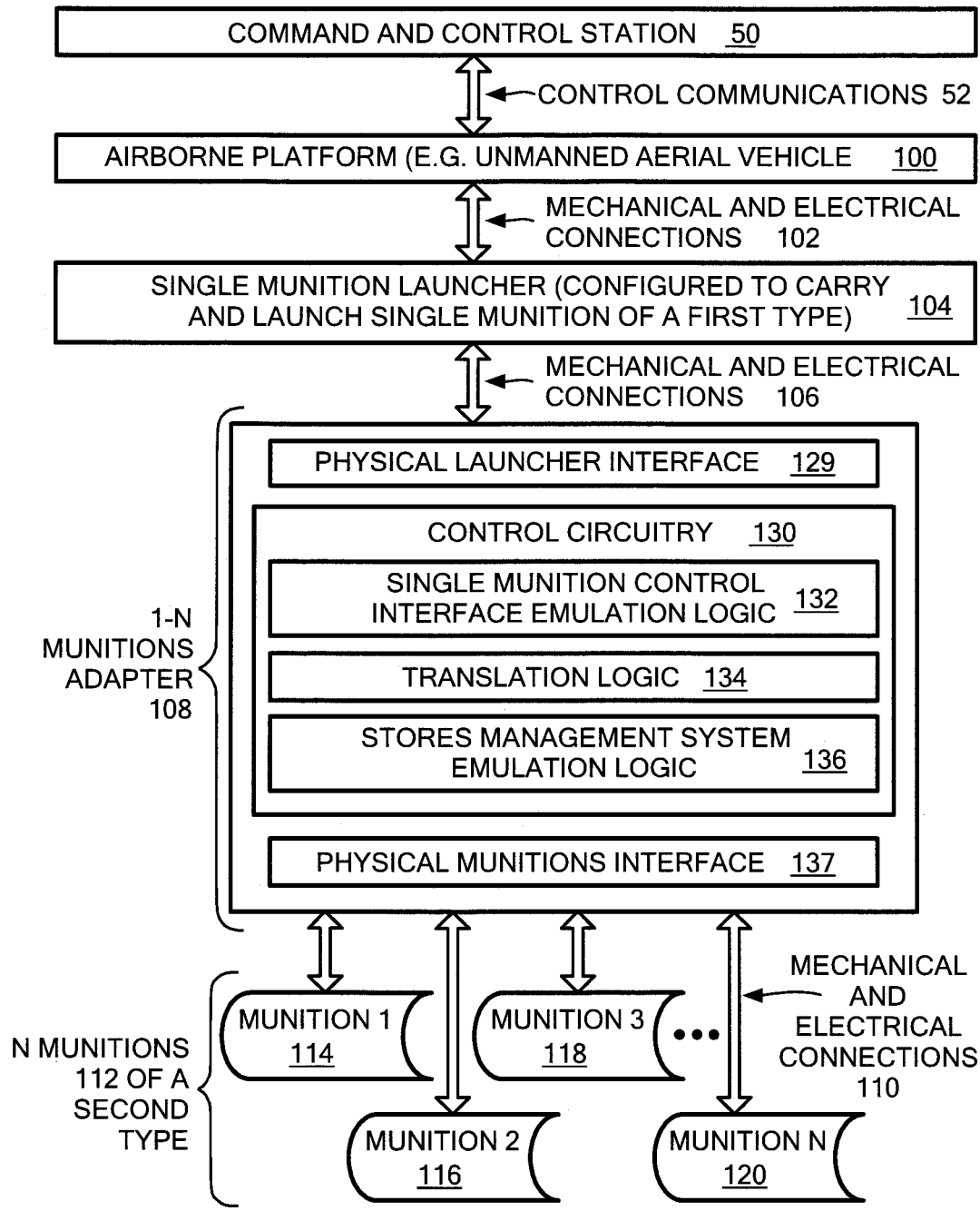
FIG. 1 is a block diagram showing an example of an operational environment and an example of an embodiment of a 1-to-N munitions adapter described herein.

FIG. 1 is a block diagram showing an example of the 1-to-N munitions adapter described herein in an operational environment. As shown in FIG. 1, a Command and Control Station 50 may remotely provide Control Communications 52 to an Airborne Platform 100. The Airborne Platform 100 may be an unmanned aerial vehicle, or may alternatively be a manned aircraft. Control Communications 52 may include commands that control the flight of the Airborne Platform 100, and may additionally include commands that cause Airborne Platform 100 to fire (e.g. launch, release, etc.) munitions that are physically carried by Airborne Platform 100 at targets that may also be indicated by the contents of Control Communications 52.

A Single Munition Launcher 104 is communicably attached to the Airborne Platform 100, e.g. by way of Mechanical and Electrical Connections 102. The Single Munition Launcher 104 is designed and configured to carry and launch a single munition of a first type. For example, in some embodiments, the Single Munition Launcher 104 may be designed and configured to carry and launch a single guided munition that is powered by a single solid-fuel rocket engine (e.g. a single air to surface missile).

The 1-to-N Munitions Adapter 108 is communicably coupled to the Single Munition Launcher 104, e.g. by way of Mechanical and Electrical Connections 106. The 1-to-N Munitions Adapter 108 is configured and arranged to carry and release or launch individual and/or multiple munitions of a second type in response to a single launch command received from the Single Munition Launcher 104. For example, in some embodiments, the 1-to-N Munitions Adapter 108 is configured and arranged to carry and control the release of individual and/or multiple munitions of a second type that are guided glide weapons not having rocket power (e.g. guided glide weapons or unguided munitions such as what may sometimes be referred to as "dumb bombs"). The multiple munitions of the second type that are carried and selectively released by the 1-to-N Munitions Adapter 108 may each have a different size and/or geometry than the individual munitions of the first type that the Single Munition Launcher 104 is designed and configured to carry and launch.

In the example of FIG. 1, the 1-to-N Munitions Adapter 108 is communicably coupled by way of Mechanical and Electrical Connections 110 to N Munitions 112 of the second type, shown for purposes of illustration in FIG. 1 by Munition 1 114, Munition 2 116, Munition 3 118, and so on through Munition N 120. The 1-to-N Munitions Adapter 108 may include a Physical Launcher Interface 129 that is configured and arranged to mechanically and electrically connect the 1-to-N Munitions Adapter 108 to the Single Munition Launcher 104, and a Physical Munitions Interface 137 that is configured and arranged to mechanically and electrically connect the 1-to-N Munitions Adapter 108 to the N Munitions 112 of the second type.

In some embodiments, the 1-to-N Munitions Adapter 108 may include and operate at least in part based on Control Circuitry 130. Control Circuitry 130 may, for example, include Single Munition Control Interface Emulation Logic 132, Translation Logic 134, and Stores Management System Emulation Logic 136.

Control Circuitry 130 may be implemented in a variety of ways including via one or more processors (or cores) running specialized software (i.e. executable program code or instructions) stored in a memory, specialized application specific ICs (ASICs), field programmable gate arrays (FPGAs) and associated programs, discrete components, analog circuits, other specialized hardware circuitry, combinations thereof, and so on. In embodiments with one or more processors executing software, a computer program product is capable of delivering all or portions of the software to the 1-to-N Munitions Adapter 108. The computer program product may include a non-transitory and non-volatile computer readable medium that stores a set of instructions that control one or more operations of the 1-to-N Munitions Adapter 108. Examples of suitable computer readable storage media include tangible articles of manufacture and apparatus that store instructions in a non-volatile manner such as CD ROM, flash memory, disk memory, and the like.

In the example of FIG. 1, for purposes of illustration and explanation, Control Circuitry 130 includes Single Munition Control Interface Emulation Logic 132 that emulates a control interface of a single munition of the first type to the Single Munition Launcher 104, at least in part by identifying the 1-to-N Munitions Adapter 108 as a single munition of the first type to the Single Munition Launcher 104, such that 1-to-N Munitions Adapter 108 appears as a single munition of the first type to Single Munition Launcher 104. Control Circuitry 130 may further include a Stores Management System Emulation Logic 136 that emulates a weapon stores management system to one or more of the N Munitions 112 of the second type, and a Translation Logic 114 that translates signals, commands, data, etc., received from the Single Munition Launcher 104 through the Single Munition Control Interface Emulation Logic 132 to other signals, commands, data, etc., that are then used by Stores Management System Emulation Logic 136 to selectively control the release and/or targeting of individual and/or multiple ones of the N Munitions 112 of the second type while the Airborne Platform 100 is in flight.

In some embodiments, Translation Logic 134 may be configured and arranged to cause Stores Management System Emulation Logic 136 to selectively control the release of individual and/or multiple ones of the N Munitions 112 of the second type while Airborne Platform 100 is in flight at least in part by determining a specific number of the N Munitions 112 that are to be released in response to receipt of a single launch (or "fire") command by 1-N Munitions Adapter 108 from Single Munition Launcher 104 based on some number of launch control signals for a single munition of the first type that are received by 1-N Munitions Adapter 108 from Single Munition Launcher 104 at the time the launch command is received from Single Munition Launcher 104.

In some embodiments the Translation Logic 134 may be configured and arranged to cause Stores Management System Emulation Logic 136 to selectively control the release of individual and/or multiple ones of the N Munitions 112 of the second type at least in part by determining a specific number of munitions that are to be released that is between 1 and N in response to which one of N discrete sets of single munition launch control signals that control launch and mission parameters of a single munition of the first type is received from the Single Munition Launcher 104. In such embodiments, each one of the N discrete sets of single munition launch control signals uniquely corresponds to a number of munitions of the second type between 1 and N that are to be released by 1-to-N Munitions Adapter 108. For example, Translation Logic 134 may operate in part by translating (or "re-purposing") each one of N sets of launch control signals that control the launch and/or trajectory shape of a single munition of the first type into a unique corresponding number of the N Munitions 112 of the second type that are to be automatically released by 1-N Munitions Adapter 108 at the time a launch (or "fire") command is received by 1-N Munitions Adapter 108 from the Single Munition Launcher 104.

In some embodiments, the N Munitions 112 of the second type that are carried by 1-to-N Munitions Adapter 108 may initially include three munitions of the first type (N=3), and Translation Logic 134 may be operable to cause Stores Management System Emulation Logic 136 to selectively control the release of an individual and/or multiple ones of the N Munitions 112 of the second type from 1-to-N Munitions Adapter 108 at least in part by i) causing up to one available munition of the second type to be released in response to detecting the receipt of a first set of single munition launch control signals from the Single Munition Launcher 104 at the time the launch command is received from the Single Munition Control Launcher 104, ii) causing up to two available munitions of the second type to be released in response to detecting the receipt of a second set of single munition launch control signals from the single munition launcher at the time the launch command is received from the Single Munition Launcher 104, and iii) causing all remaining available munitions of the second type to be released in response to detecting the receipt of a third set of launch control signals from the single munition launcher at the time the launch command is received from the Single Munition Launcher 104.

In some embodiments, the Translation Logic 134 may be configured and arranged to cause Stores Management System Emulation Logic 136 to load a single target location that is received by 1-N Munitions Adapter 108 from the Single Munition Launcher 104 into each one of the N Munitions 112 of the second type that are to be released in response to receipt of a single launch command that is received by 1-N Munitions Adapter 108 from the Single Munition Launcher 104.

In some embodiments, in response to detecting the release of at least one of the N Munitions 112 of the second type onto a target, the Translation Logic 134 may determine whether there is at least one more of the N Munitions 112 of the second type remaining that is physically coupled to the 1-to-N Munitions Adapter 108. In response to detecting that there is at least one more unreleased munition of the second type remaining, Translation Logic 134 may cause the 1-to-N Munitions Adapter 108 to reset itself (transition to an unpowered mode or other type of reset operation), and to then generate a signal (e.g. as part of a status code or the like conveyed by the Single Munition Control Interface Emulation Logic 132 to the Single Munition Launcher 104) that is accessible by the Single Munition Launcher 104, and that indicates to the Single Munition Launcher 104 that a single munition of the first type is available for launch. In some embodiments, the Translation Logic 134 may cause the Single Munition Control Emulation Logic 132 to respond to a query received by the 1-N Munitions Adapter 108 from the Single Munition Launcher 104 inquiring as to whether a single munition of the first type is available to be launched by indicating to the Single Munition Launcher 104 that a single munition of the first type is available to be launched in any case where one or more munitions of the second type remain physically carried by the 1-to-N Munitions Adapter 108, and are accordingly available to be released by the 1-to-N Munitions Adapter 108.

In some embodiments, the translation logic may be configured and arranged to translate a single target location received by 1-to-N Munitions Adapter 108 from the Single Munition Launcher 104 from a first location format understood by munitions of the first type that the Single Munition Launcher 104 is designed and configured to launch (e.g. a location format that can be processed by targeting logic in munitions of the first type) to a second location format that is understood by the munitions of the second type that the 1-to-N Munitions Adapter 108 is configured and arranged to carry and control the release of (e.g. a location format that can be processed by targeting logic in munitions of the second type). Examples of target location formats that may be translated by embodiments of the disclosed 1-N munitions adapter 108 include formats for angular-based targeting (e.g., platform- or launcher-referenced azimuth, elevation), coordinate-based targeting (e.g., latitude/longitude/altitude, Military Grid Reference System (MGRS), etc.), geodetic coordinates, combinations thereof, and so on.

In some embodiments, the Single Munition Launcher 104 may include multiple interface points. Each one of the multiple interface points may be capable of carrying and controlling a single munition of the first type. In such embodiments, a separate individual 1-to-N Munitions Adapter 108 may be physically attached to each individual one of the interface points of the Single Munition Launcher 104. Such multiple interface points of the Single Munition Launcher 104 may sometimes be referred to as "rails" of the single munition launcher.

Figure 2:
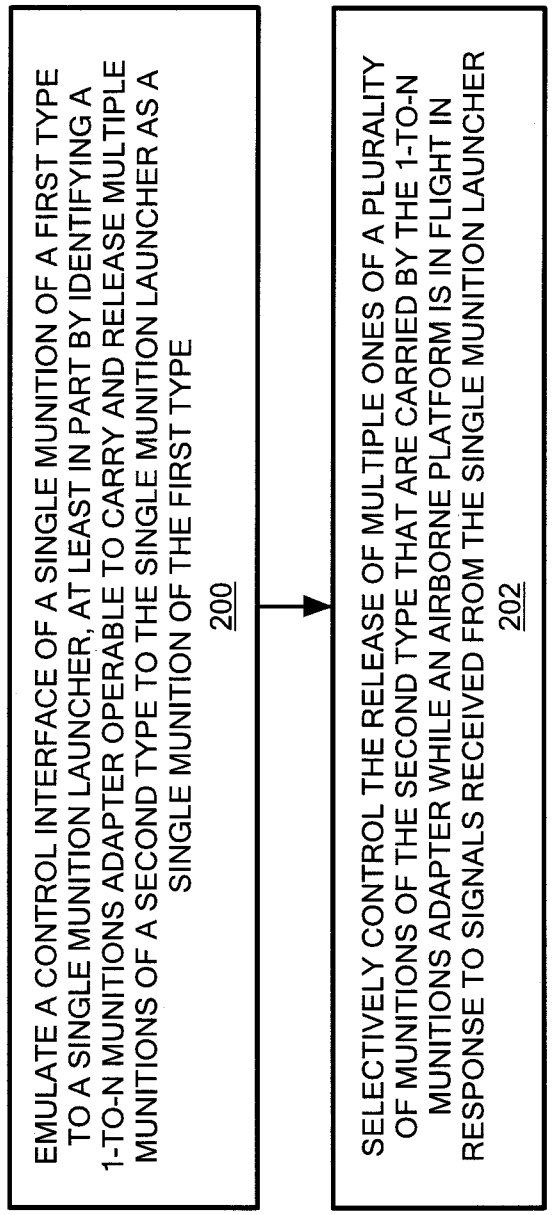
FIG. 2 is a flow chart showing an example of steps performed during operation of some embodiments of the 1-to-N munitions adapter described herein.

FIG. 2 is a flow chart showing an example of steps performed during operation of some embodiments of the 1-to-N Munitions Adapter 108. For example, the steps of FIG. 2 may be performed in whole or in part by or under the control of the Control Circuitry 130.

At step 200, the 1-to-N Munitions Adapter 108 emulates the control interface of a single munition of a first type to the Single Munition Launcher 104. For example, the 1-to-N Munitions Adapter 108 may emulate the control interface of a single munition of the first type to the Single Munition Launcher 104 at least in part by identifying the 1-to-N Munitions Adapter 108 to the Single Munition Launcher 104 as a single munition of the first type.

At step 202 of FIG. 2, the 1-to-N Munitions Adapter 108 selectively controls the release of multiple ones of a plurality of munitions of the second type 112 that are carried by the 1-to-N Munitions Adapter 108 while the Airborne Platform 100 is in flight in response to signals received from the Single Munition Launcher 104, e.g. in response to launch control signals received by 1-to-N Munitions Adapter 108 from Single Munition Launcher 104 that Single Munition Launcher 104 issues in order to launch and/or to control the launch and mission parameters of a single munition of the first type.

Figure 3:
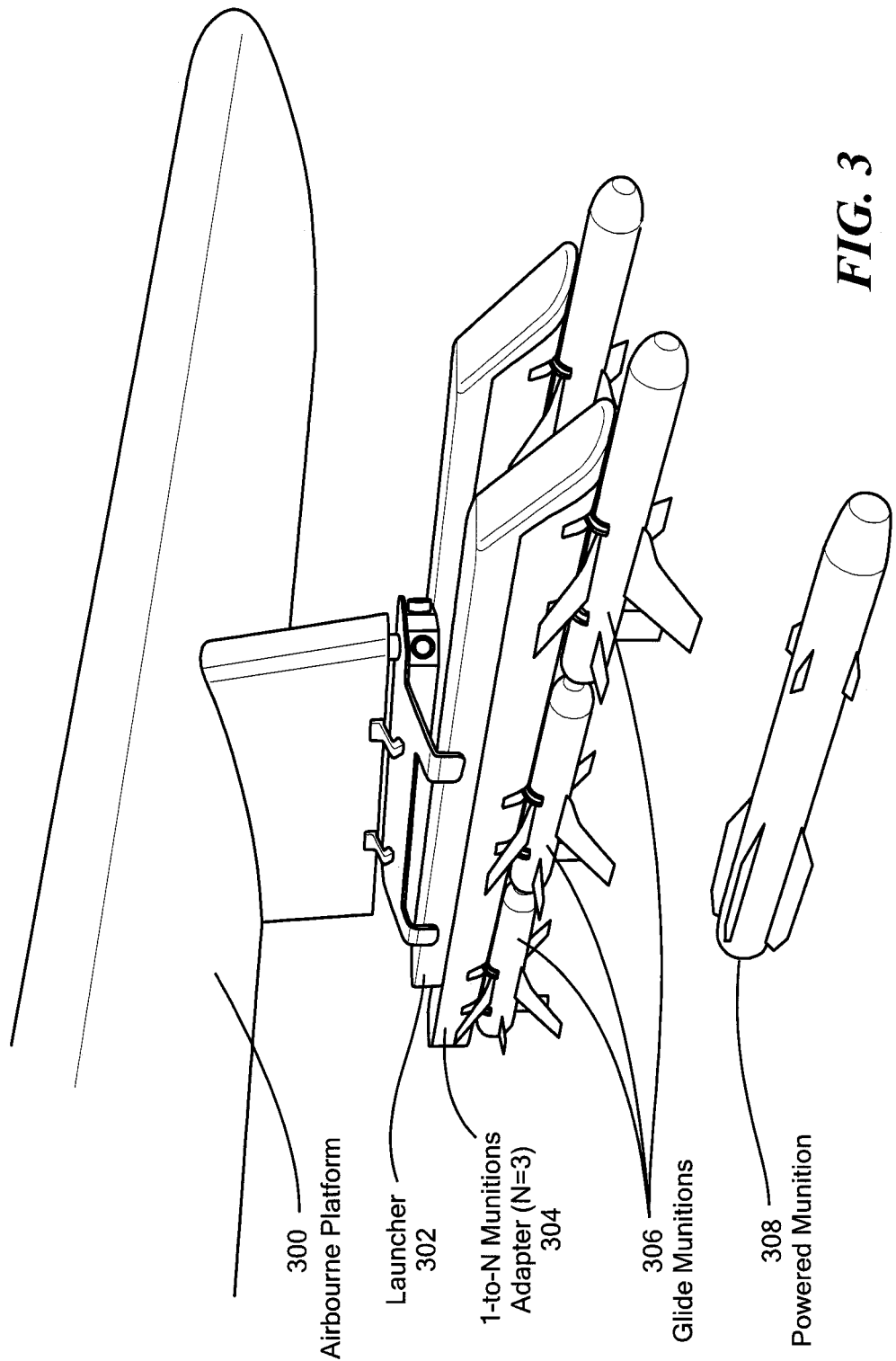
FIG. 3 shows an illustrative embodiment of the 1-to-N munitions adapter described herein and an operational environment for the illustrative embodiment.

FIG. 3 shows an illustrative embodiment of the 1-to-N munitions adapter described herein in an example of an operational environment. FIG. 3 illustrates an Airborne Platform 300. For purposes of clarity and concise illustration, the illustration of Airborne Platform 300 in FIG. 3 includes only a portion of a wing, e.g. a portion of a wing of an unmanned aerial vehicle.

FIG. 3 also shows a Launcher 302 that includes or consists of one interface point of a single munitions launcher that includes multiple interface points.

FIG. 3 also shows a 1-to-N Munitions Adapter 304 that is an example of the 1-to-N Munitions Adapter 108 shown in FIG. 1. In the example of FIG. 3, N=3, and the 1-to-N Munitions Adapter 304 is configured and arranged to initially carry three munitions of the second type, and is coupled to Launcher 302. Three Glide Munitions 306 are shown coupled to the 1-to-N Munitions Adapter 304. The Glide Munitions 306 are examples of the N Munitions 112 shown in FIG. 1.

In addition, and for purposes of comparison, FIG. 3 also shows a Powered Munition 308 that is an example of a single munition of the first type. The Powered Munition 308 is shown in the example of FIG. 3 in order to illustrate that in some embodiments, the munition of the first type may have a size and geometry that differs from the size and geometry of the munitions of the second type.

Figure 4:
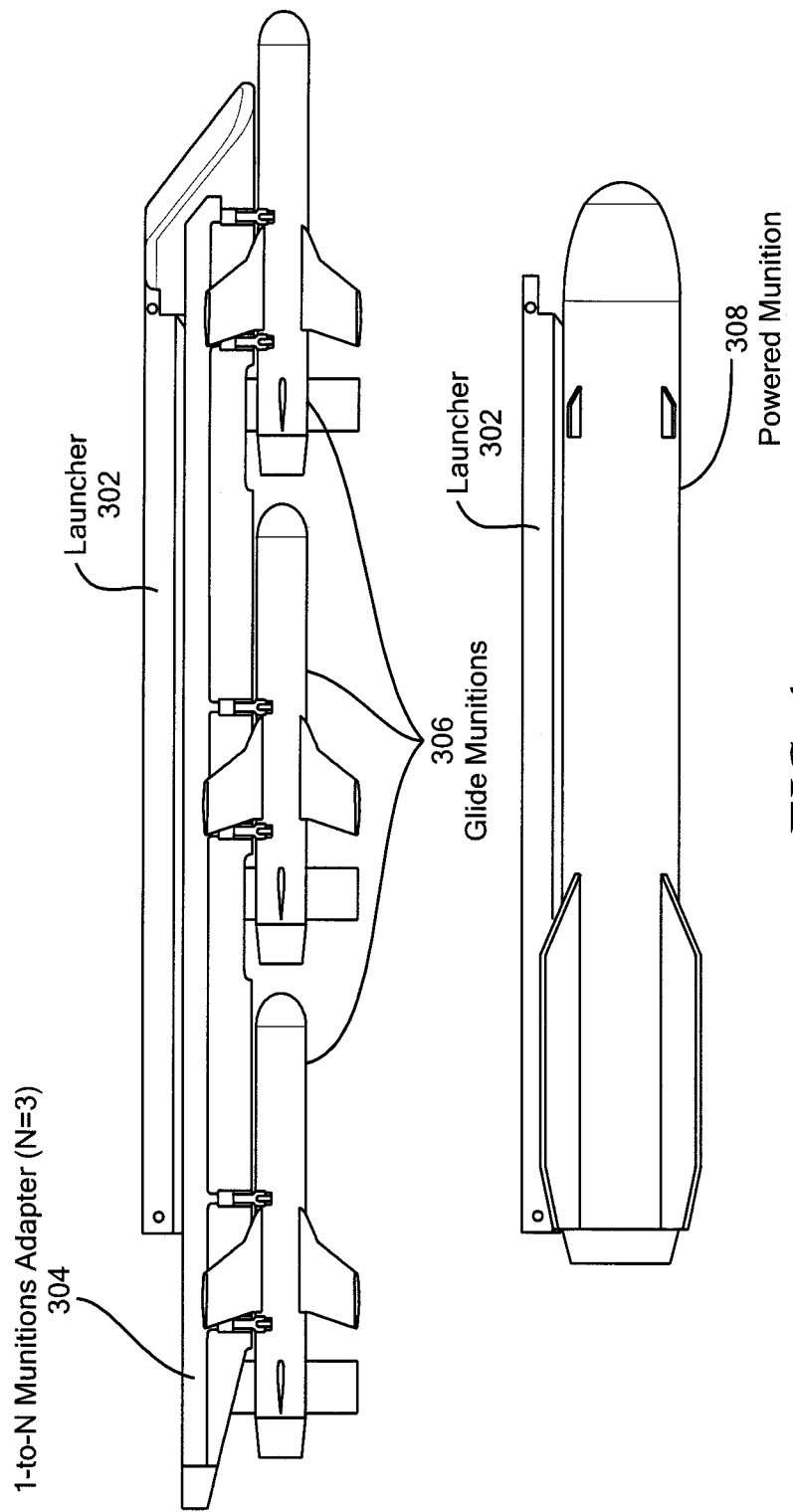
FIG. 4 shows a side view of an illustrative embodiment of the 1-to-N munitions adapter described herein, showing the 1-to-N munitions adapter coupled to a single munition launcher, and showing the single munition launcher alternatively coupled to a single powered munition of the first type.

FIG. 4 shows an example of a side view of the 1-to-N Munitions Adapter 304 coupled to Launcher 302. FIG. 4 also shows an example of a side view of the coupling between 1-to-N Munitions Adapter 304 and the Glide Munitions 306. FIG. 4 also shows a side view of the Powered Munition 308, showing how the Powered Munition 308 may be coupled directly to the Launcher 302 when 1-to-N Munitions Adapter 304 is not present, since Launcher 302 is designed and configured to carry and launch the Powered Munition 308 without the use of 1-to-N Munitions Adapter 304.

Figure 5:
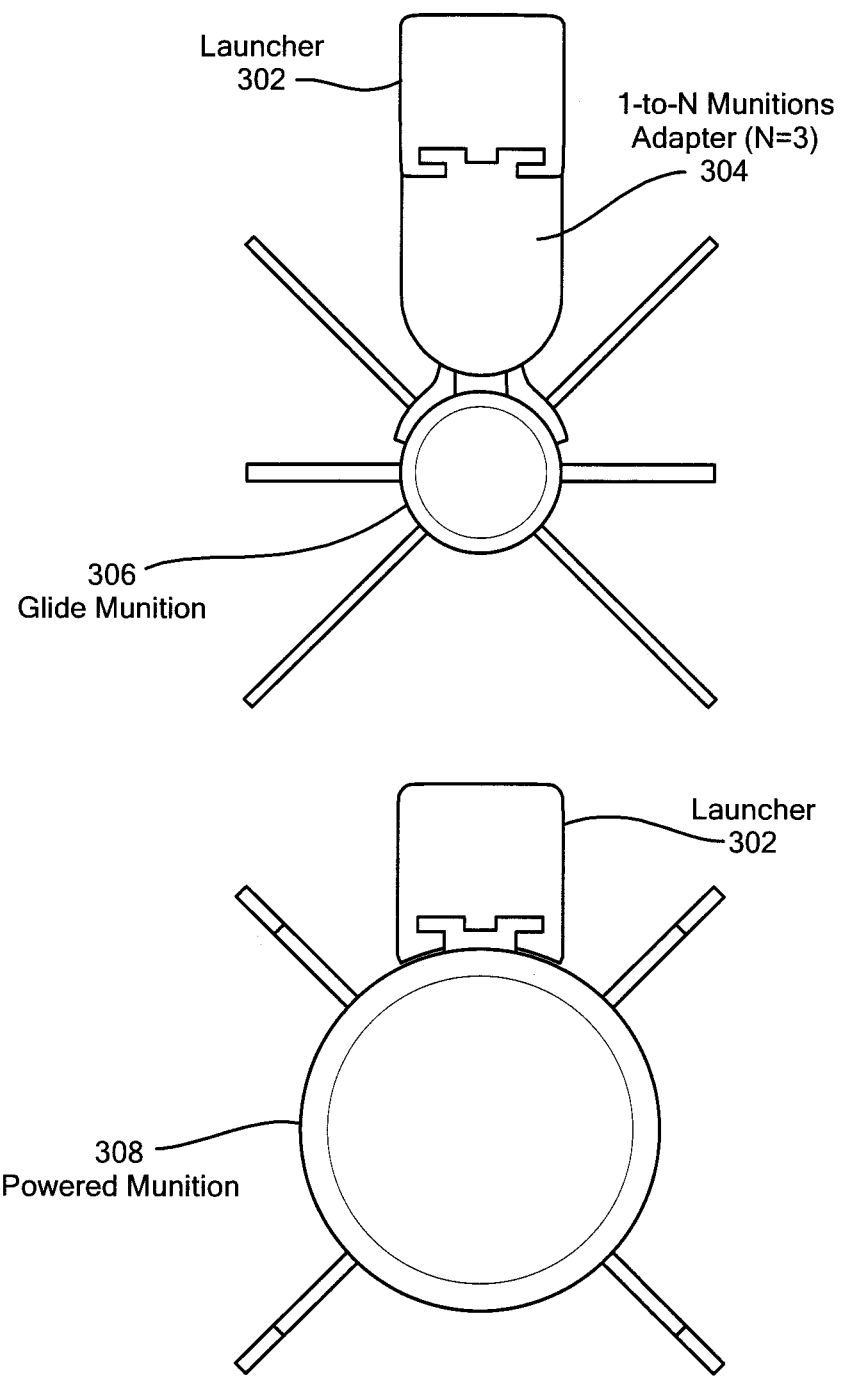
FIG. 5 shows a rear view of an illustrative embodiment of the 1-to-N munitions adapter described herein, also showing the 1-to-N munitions adapter coupled to the single munition launcher, and showing the single munition launcher alternatively coupled to a single powered munition of the first type.

FIG. 5 shows an example of a rear view of the 1-to-N Munitions Adapter 304 coupled to Launcher 302. FIG. 5 also shows an example a rear view of the coupling between 1-to-N Munitions Adapter 304 and the Glide Munitions 306 (e.g. a rear view of the coupling of 1-to-N Munitions Adapter 304 to a rear-most one of the Glide Munitions 306). FIG. 4 also shows a rear view of the Powered Munition 308, again showing how the Powered Munition 308 may be coupled directly to the Launcher 302 when 1-to-N Munitions Adapter 304 is not present, since Launcher 302 is designed and configured to carry and launch the Powered Munition 308 without the use of 1-to-N Munitions Adapter 304.

Figure 6:
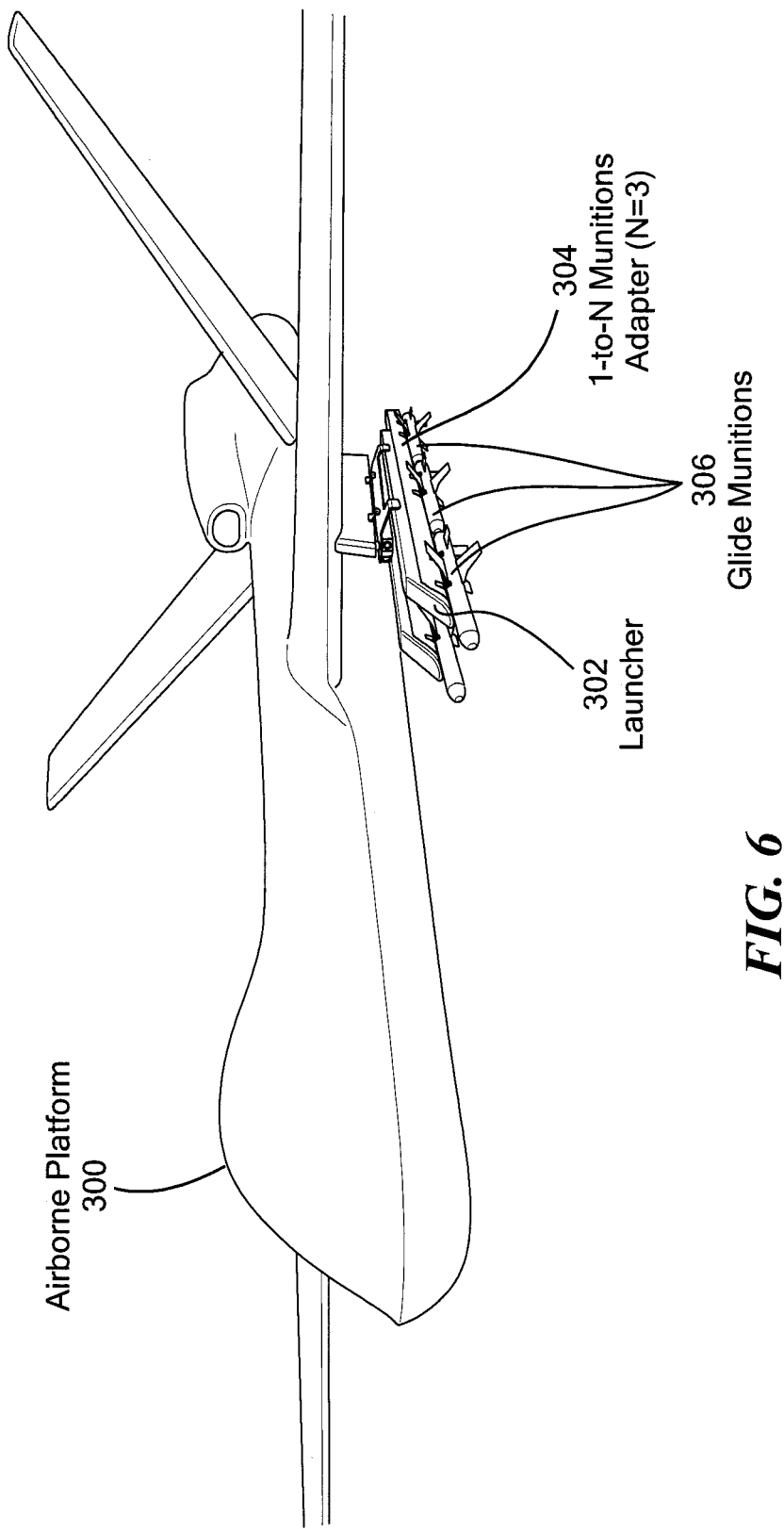
FIG. 6 shows another view of an airborne platform having a single munition launcher with an illustrative embodiment of the 1-to-N munitions adapter described herein coupled thereto.

FIG. 6 shows another example of Airborne Platform 300 (e.g. an unmanned aerial vehicle), and shows examples of Launcher 302, 1-to-N Munitions Adapter 304, and Glide Munitions 306.

As will be appreciated by one skilled in the art, aspects of the 1-to-N munitions adapter disclosed herein may be embodied as a system, method and/or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure. Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

While the invention is described through the above exemplary embodiments, it will be understood by those of ordinary skill in the art that modification to and variation of the illustrated embodiments may be made without departing from the inventive concepts herein disclosed.

What is claimed is:

1. A 1-to-N munitions adapter for an airborne platform, comprising:
   a physical launcher interface that is configured and arranged to mechanically and electrically connect the 1-to-N munitions adapter to a single munition launcher that is i) configured and arranged to carry and launch a single munition of a first type, wherein the single munition of the first type has a first size and is powered by a single solid-fuel rocket engine, and ii) integrated to an airborne platform;
   a physical munitions interface that mechanically and electrically connects the 1-to-N munitions adapter to a plurality of munitions of a second type, wherein each of the munitions of the second type have a second size, and wherein the munitions of the second type are glide weapons without rocket power; and
   electronic control circuitry that:
      emulates a control interface of a single munition of the first type to the single munition launcher, at least in part by identifying the 1-to-N munitions adapter to the single munition launcher as a single munition of the first type, and
      selectively controls the release of multiple ones of a plurality of munitions of the second type that are carried by the 1-to-N munitions adapter while the airborne platform is in flight in response to signals received from the single munition launcher.

2. The 1-to-N munitions adapter of claim 1, wherein the electronic control circuitry is further configured and arranged to selectively control the release of multiple ones of the munitions of the second type that are carried by the 1-to-N munitions adapter while the airborne platform is in flight at least in part by determining a specific number of munitions of the second type that are to be released by the 1-to-N munitions adapter for a specific launch command received from the single munition launcher in response to launch control signals for a single munition of the first type that are received from the single munition launcher at the time the launch command is received by the 1-to-N munitions adapter from the single munition launcher.

3. The 1-to-N munitions adapter of claim 1, wherein the electronic control circuitry is further configured and arranged to selectively control the release of multiple ones of the munitions of the second type that are carried by the 1-to-N munitions adapter while the airborne platform is in flight at least in part by determining a specific number of munitions of the second type that are to be released that is between 1 and N in response to determining which one of N discrete sets of single munition launch control signals is received by the 1-to-N munitions adapter from the single munition launcher, where each one of the N discrete sets of single munition launch control signals uniquely corresponds to a number of munitions of the second type to be released that is between 1 and N.

4. The 1-to-N munitions adapter of claim 1, wherein the plurality of munitions of the second type that are carried by the 1-to-N munitions adapter consists of three munitions of the second type, and wherein the electronic control circuitry is further configured and arranged to selectively control the release of multiple ones of the munitions of the second type that are carried by the 1-to-N munitions adapter while the airborne platform is in flight at least in part by:
 releasing up to a single munition of the second type in response to detecting the receipt of a first set of single munition launch control signals from the single munition launcher at the time a launch command is received from the single munition launcher;
 releasing up to two munitions of the second type in response to detecting the receipt of a second set of single munition launch control signals from the single munition launcher at the time the launch command is received from the single munition launcher; and
 releasing all remaining munitions of the second type in response to detecting the receipt of a third set of launch control signals from the single munition launcher at the time the launch command is received from the single munition launcher.

5. The 1-to-N munitions adapter of claim 4, wherein the electronic control circuitry is further configured and arranged to load a single target location received from the single munition launcher into each one of the multiple munitions of the second type to be released in response to receipt of the launch command from the single munition launcher.

6. The 1-to-N munitions adapter of claim 1, wherein the electronic control circuitry is further configured and arranged to:
 in response to detecting that the 1-to-N munitions adapter has released at least one munition of the second type on a target, determine whether there is at least one additional munition of the second type present on the 1-to-N munitions adapter; and
 in response to detecting that there is at least one additional munition of the second type present on the 1-to-N munitions adapter, i) reset the 1-to-N munitions adapter and ii) generate a signal that is accessible to the single munition launcher and that indicates to the single munition launcher that a single munition of the first type is available for launch.

7. The 1-to-N munitions adapter of claim 1, wherein the electronic control circuitry is further configured and arranged to translate a single target location received from the single munition launcher from a first location format understood by the first type of munition to a second location format that is understood by the second type of munition.

8. The 1-to-N munitions adapter of claim 1, wherein the electronic control circuitry is further configured and arranged to emulate a weapon stores management system to the plurality of munitions of the second type that are carried by the 1-to-N munitions adapter.

9. The 1-to-N munitions adapter of claim 1, wherein the single munition launcher includes multiple interface points, each one of the multiple interface points of the single munition launcher being capable of carrying and controlling a single munition of the first type, and wherein the 1-to-N munitions adapter is operable to be communicably attached to one of the individual interface points of the single munition launcher.

10. A method of operating a 1-to-N munitions adapter for an airborne platform, wherein the 1-to-N munitions adapter includes a physical launcher interface that is configured and arranged to mechanically and electrically connect the 1-to-N munitions adapter to a single munition launcher integrated to an airborne platform and configured and arranged to carry and launch a single munition of a first type, wherein the single munition of the first type has a first size and is powered by a single solid-fuel rocket engine, and wherein the 1-to-N munitions adapter further includes a physical munitions interface that mechanically and electrically connects the 1-to-N munitions adapter to a plurality of munitions of a second type, the method comprising:
 emulating a control interface of a single munition of the first type to the single munition launcher, at least in part by identifying the 1-to-N munitions adapter to the single munition launcher as a single munition of the first type; and
 selectively controlling the release of multiple ones of a plurality of munitions of the second type that are carried by the 1-to-N munitions adapter while the airborne platform is in flight in response to signals received from the single munition launcher, wherein each of the munitions of the second type have a second size, and wherein the munitions of the second type are glide weapons without rocket power.

11. The method of operating a 1-to-N munitions adapter for an airborne platform as in claim 10, and further comprising:
 selectively controlling the release of multiple ones of the munitions of the second type that are carried by the 1-to-N munitions adapter while the airborne platform is in flight at least in part by determining a specific number of munitions that are to be released by the 1-to-N munitions adapter for a specific launch command received from the single munition launcher in response to launch control signals for a single munition of the first type that are received from the single munition launcher at the time the launch command is received by the 1-to-N munitions adapter from the single munition launcher.

12. The method of operating a 1-to-N munitions adapter for an airborne platform as in claim 10, and further comprising:
 selectively controlling the release of multiple ones of the munitions of the second type that are carried by the 1-to-N munitions adapter while the airborne platform is in flight at least in part by determining a specific number of munitions that are to be released that is between 1 and N in response to which one of N discrete sets of single munition launch control signals is received by the 1-to-N munitions adapter from the single munition launcher, where each one of the N discrete sets of single munition launch control signals uniquely corresponds to a number of munitions to be released that is between 1 and N.

13. The method of operating a 1-to-N munitions adapter for an airborne platform as in claim 10, wherein the plurality of munitions of the second type that are carried by the 1-to-N munitions adapter consists of three munitions of the second type, and wherein selectively controlling the release of multiple ones of the munitions of the second type that are carried by the 1-to-N munitions adapter while the airborne platform is in flight further comprises:
  releasing up to a single munition of the second type in response to detecting the receipt of a first set of single munition launch control signals from the single munition launcher at the time a launch command is received from the single munition launcher;
  releasing up to two munitions of the second type in response to detecting the receipt of a second set of single munition launch control signals from the single munition launcher at the time the launch command is received from the single munition launcher; and
  releasing all remaining munitions of the second type in response to detecting the receipt of a third set of launch control signals from the single munition launcher at the time the launch command is received from the single munition launcher.

14. The method of operating a 1-to-N munitions adapter for an airborne platform as in claim 13, and further comprising loading a single target location received from the single munition launcher into each one of the multiple munitions to be released in response to receipt of the launch command from the single munition launcher.

15. The method of operating a 1-to-N munitions adapter for an airborne platform as in claim 10, and further comprising:
  in response to detecting that the 1-to-N munitions adapter has released at least one munition of the second type on a target, determining whether there is at least one additional munition of the second type present on the 1-to-N munitions adapter; and
  in response to detecting that there is at least one additional munition present on the 1-to-N munitions adapter, i) resetting the 1-to-N munitions adapter and ii) generating a signal that is accessible to the single munition launcher and that indicates to the single munition launcher that a single munition of the first type is available for launch.

16. The method of operating a 1-to-N munitions adapter for an airborne platform as in claim 10, and further comprising:
  translating a single target location received from the single munition launcher from a first location format understood by the first type of munition to a second location format that is understood by the second type of munition.

17. The method of operating a 1-to-N munitions adapter for an airborne platform as in claim 10, and further comprising:
  emulating a weapon stores management system to the plurality of munitions of the second type that are carried by the 1-to-N munitions adapter.

18. A computer program product having a non-transitory computer readable medium which stores a set of instructions operable to control the operation of a 1-to-N munitions adapter for an airborne platform, wherein the 1-to-N munitions adapter includes a physical launcher interface that is configured and arranged to mechanically and electrically connect the 1-to-N munitions adapter to a single munition launcher integrated to an airborne platform and configured and arranged to carry and launch a single munition of a first type, wherein the single munition of the first type has a first size and is powered by a single solid-fuel rocket engine, and wherein the 1-to-N munitions adapter further includes a physical munitions interface that mechanically and electrically connects the 1-to-N munitions adapter to a plurality of munitions of a second type, the set of instructions, when executed by processing circuitry, causing the processing circuitry to:
  emulate a control interface of a single munition of the first type to the single munition launcher, at least in part by identifying the 1-to-N munitions adapter to the single munition launcher as a single munition of the first type; and
  selectively control the release of multiple ones of a plurality of munitions of the second type that are carried by the 1-to-N munitions adapter while the airborne platform is in flight in response to signals received from the single munition launcher, wherein each of the munitions of the second type have a second size, and wherein the munitions of the second type are glide weapons without rocket power.

* * * * *